United States Patent [19]

Minegishi et al.

[11] Patent Number: 5,203,231

[45] Date of Patent: Apr. 20, 1993

[54] MOTOR-EQUIPPED ORTHOGONAL GEAR DEVICE

[75] Inventors: Kiyoji Minegishi, Aichi; Isao Kohno, Nagoya; Tetsushi Isozaki; Katsumi Taki, both of Ohbu, all of Japan

[73] Assignee: Sumitomo Heavy Industries, Ltd., Tokyo, Japan

[21] Appl. No.: 828,438

[22] Filed: Jan. 30, 1992

[30] Foreign Application Priority Data

Jan. 31, 1991 [JP] Japan .................................. 3-31983

[51] Int. Cl.$^5$ ............................................ F16H 57/02
[52] U.S. Cl. .................................... 74/606 R; 74/607
[58] Field of Search .................... 74/606 R, 607, 606 A

[56] References Cited

U.S. PATENT DOCUMENTS

| | | | |
|---|---|---|---|
| 2,734,393 | 2/1956 | Luenberger | 74/606 R |
| 3,143,897 | 8/1964 | Kohn | 74/606 R |
| 3,521,504 | 7/1970 | Jorg | 74/606 R |
| 4,020,715 | 5/1977 | Sollars | 74/606 R |
| 4,282,767 | 8/1981 | Guichard | 74/427 |
| 4,986,144 | 1/1991 | Kobayashi et al. | 74/606 R |

FOREIGN PATENT DOCUMENTS

| | | |
|---|---|---|
| 0352416 | 1/1990 | European Pat. Off. . |
| 3204968 | 12/1982 | Fed. Rep. of Germany . |
| 926168 | 5/1963 | United Kingdom ............. 74/606 R |
| 2052676 | 1/1981 | United Kingdom . |
| 2053408 | 2/1981 | United Kingdom . |

*Primary Examiner*—Allan D. Herrmann
*Assistant Examiner*—William O. Trousdell
*Attorney, Agent, or Firm*—Nikaido, Marmelstein, Murray & Oram

[57] ABSTRACT

An output shaft is a hollow shaft and passes through a gearbox. Holes for mounting also pass through the gearbox. The holes are located at the vertexes of a square or rectangle. And the output shaft, which is displaced (offset) relative to the square's (or rectangle's) center, is located on one diagonal of the square. This structure provides a variety of possibilities of assembling the gear device with a big motor, and the amount of projection of the faces of the gearbox from the output shaft can be kept as small as possible.

10 Claims, 9 Drawing Sheets

*PRIOR ART*

MOTOR-EQUIPPED ORTHOGONAL GEAR DEVICE

BACKGROUND OF THE INVENTION

1. Field of the Invention

The present invention relates to a motor-equipped orthogonal gear device which can be mounted to a mating machine in various ways, which is lightweight, compact and highly efficient and which is ideal for uses in physical distribution equipment, especially in chain conveyors.

2. Description of the Prior Art

In recent years, in the physical distribution equipment market, especially in the chain conveyor market, there has been increased need for "motor-equipped orthogonal gear devices". The "motor-equipped orthogonal gear device" has a motor, and the motor shaft and output shaft of device are orthogonal.

The reason why "motor-equipped" is demanded is as follows. For example, in a physical distribution system comprising a plurality of chain conveyors, it is efficient for portions of the system to be operated only when it is necessary for these portions to operate. In this case, it is convenient that each individual chain conveyor is driven independently. Also, a disposition of individual chain conveyors is often changed in order to change the conveying path. In this case, too, it is convenient that each individual chain conveyor is driven independently.

On the other hand, the reason why "orthogonal gear device" is demanded is as follows. The largest size (the size of longitudinal direction) of motor-equipped gear devices is in axial direction of the motor. In order to improve the spatial efficiency, it is the best arrangement that the direction of the largest size (the direction of the motor shaft) is parallel to the chain conveyor. However, in order to drive the shaft of the chain conveyor, the axis of the output shaft of the gear device must be parallel to the axis of the shaft of the chain conveyor. Accordingly, the output shaft axis of the gear device and the motor shaft axis must be orthogonal.

By the way, a motor-equipped orthogonal gear device is nothing but one of the component of the mating machine (a chain conveyor and the like). Furthermore, the mating machine is also nothing but one of the component of the overall physical distribution system. Accordingly, in relation with the overall physical distribution system, it often happens that various members, which are obstructive to the installation, exist around the mating machine on which the gear device is to be mounted. It also often happens that it is not possible to leave an installed motor in use just as it is, in the case when, for example, a mating machine must be newly added in the vicinity of the motor.

In such cases, the gear device must be rotated by 180° to install it, or a gear device whose shaft is extended in the opposite direction must be used.

Japanese Published Application 2-53656 discloses a method for providing two types of flange series (product variations) so as to facilitate such work.

Also, Japanese Laid-Open Utility Model Application 2-22450 discloses a technique in which a gearbox directly coupled with a motor is in the shape of a hexahedron, and holes for mounting are present on faces of the gearbox that do not directly face the motor.

However, with the above-described publicly known conventional methods, there are the following difficulties that still have to be overcome.

The method disclosed by Japanese Published Application 2-53656 involves the problem that gear devices of two types of flange series (product variations) have to be designed and provided in order to allow a 4-direction (0°, 90°, 180°, 270°) rotatable mounting. Furthermore, when a gear device has to rotate in relation with the disposition of a mating machine, there is the problem that it is not always possible to freely rotate the gear device itself. That is, in order to secure four mounting directions, two types of product variations are always necessary, and there is a disadvantage that a change in the position of the holes for mounting against the output shaft occurs, if the identical device is merely rotated.

Furthermore, the following problem is associated with the method disclosed by Japanese Laid-Open Utility Model Application 2-22450.

Figure 1:
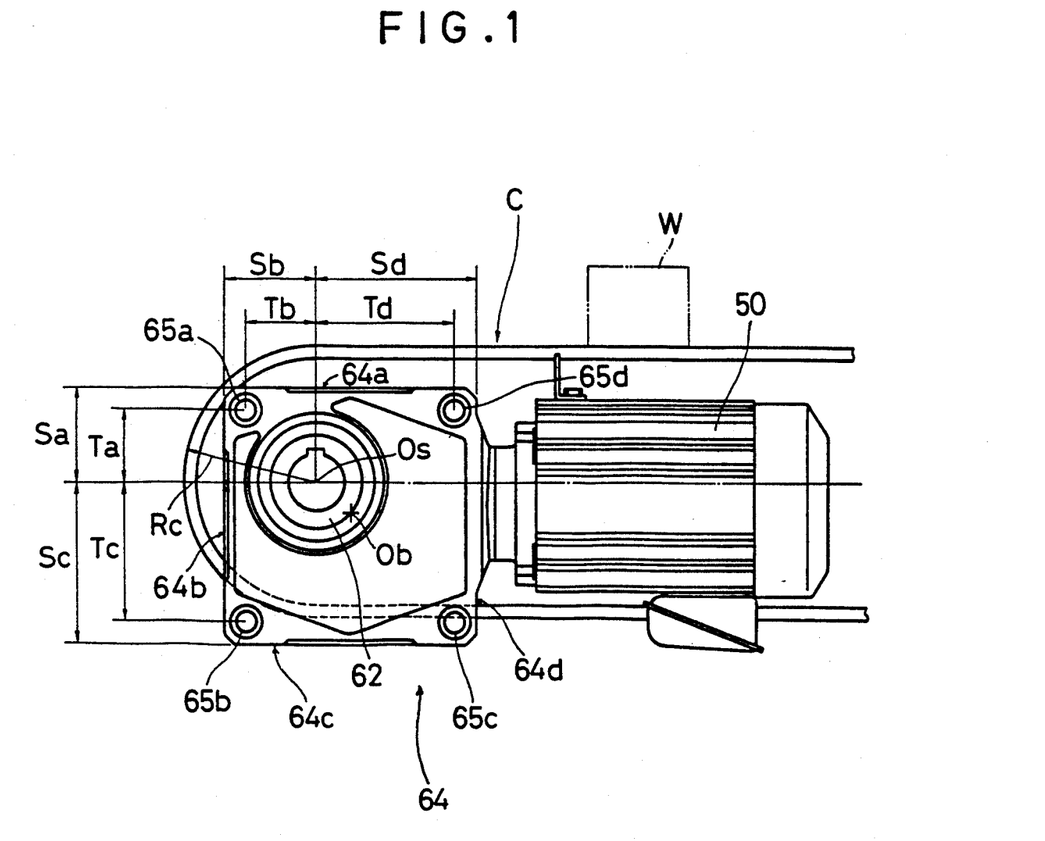
FIG. 1 is a front view of an example of an embodiment of the present invention being applied to a chain conveyor.

FIG. 1 shows an example of a motor-equipped gear device which relates to an embodiment of the present invention described in detail hereinafter and which is used in a mating machine (chain conveyor) that is part of a physical distribution system. As shown in this example, in chain conveyors for example, the length Sa, Sb from the center Os of the output shaft 62 to the outer circumference of the gearbox 64 must be smaller than the turning radius Rc of the chain conveyor C in order to avoid interference with an object W being conveyed on the chain conveyor C. The center Os of the output shaft 62 in such gear devices is therefore often displaced (offset) from the center Ob of the holes for the mounting.

If the technique disclosed by Japanese Laid-Open Utility Model Application 2-22450 is applied in this case, then the spirit of the disclosure demands that the holes for mounting shall be provided at the vertex positions of a square being arranged "coaxial" to the output shaft. The arrangement of the holes for mounting must therefore be such that the pitch thereof is relatively smaller when it is compared with the overall size of the gearbox. Accordingly, the capability of the mounting bolts accommodating the reactive force of the torque of the drive shaft tends to become small considering the size of the gearbox.

As in the example of Japanese Laid-Open Utility Model Application 2-22450, in devices using a worm reduction gear, the efficiency of the worm reduction gear itself is low and the transmission torque is small considering the size of the gearbox. Therefore, even such a bolt arrangement is certainly adequate.

However, when a high-efficiency and large-torque reduction gear is required as in conveyor applications, the mounting force by the bolts must provide a large securing strength. Therefore, the method of Japanese Laid-Open Utility Model Application 2-22450 is not practical, because it does not allow the holes for mounting to be arranged near the outer circumference of the gearbox.

SUMMARY OF THE INVENTION

The present invention was carried out in view of these difficulties. It is an object of the present invention to provide a motor-equipped orthogonal gear device which is lightweight, compact and can be mounted to a mating machine in various ways and which is ideal for driving physical distribution equipment, in particular chain conveyors.

Furthermore, it is an object of the present invention to provide a motor-equipped orthogonal gear device which is easier to mount, makes less noise and which is more efficient than conventional devices.

To achieve this aim, the present first invention provides a motor-equipped orthogonal gear device provided with a motor and a gearbox, the gearbox having an output shaft which is arranged so that it is orthogonal to the motor shaft, and the gearbox also having holes for mounting and a mountable face which is mountable to a mating machine, characterized in that the output shaft of the gearbox is a hollow shaft and passes through the gearbox, the holes for mounting are arranged in four vertex positions of a square, the square being such that a position of the output shaft is on a diagonal of the square and the position is, at the same time displaced from a center of the square, and the holes for mounting also pass through the gearbox, and two faces through which the output shaft and the holes for mounting pass are both mountable to the mating machine (embodiment 1);

Also, the present first invention achieves the above-described object by providing a motor-equipped orthogonal gear device according to embodiment 1, wherein shoulder flanges, the centers of which are identical with the center of the output shaft, are formed in the mountable faces so that the shoulder flanges bulge out from the mountable faces.

Also, the present first invention achieves the above-described object by providing a motor-equipped orthogonal gear device according to embodiment 1, wherein the motor shaft is installed between the line which joins the holes for mounting on the side farther away from the output shaft, and the output shaft.

Also, the present first invention achieves the above-described object by providing a motor-equipped orthogonal gear device according to embodiment 1, wherein part of at least one gearbox face that is, as a result of the displacement, farther away from the output shaft, is thickened and tapholes are formed in the thickened portion is order to make the gearbox face a mountable face.

Also, the present second invention achieves the above-described object by providing a motor-equipped orthogonal gear device provided with a motor and a gearbox, the gearbox having an output shaft which is arranged so that it is orthogonal to the motor shaft, characterized in that the output shaft of said gearbox is a hollow shaft, and the arrangement of the orthogonality of the motor shaft and the output shaft is realized by the mesh of a hypoid pinion, being directly formed on the motor shaft, and a hypoid gear, being mounted on a shaft, the center of which is displaced from the center of the motor shaft, and which is orthogonal to the motor shaft.

Also, the present second invention achieves the above-described object by providing a motor-equipped orthogonal gear device according to embodiment 2, wherein holes for mounting are provided, said holes for mounting being a vertex positions of a square or a rectangle, the output shaft of the gearbox is displaced from the center of said square of the rectangle, and the motor shaft is installed between the line which joins the holes for mounting on the the that is, as a result of side displacement, farther away from the output shaft, and the output shaft of the gearbox.

Figure 2:
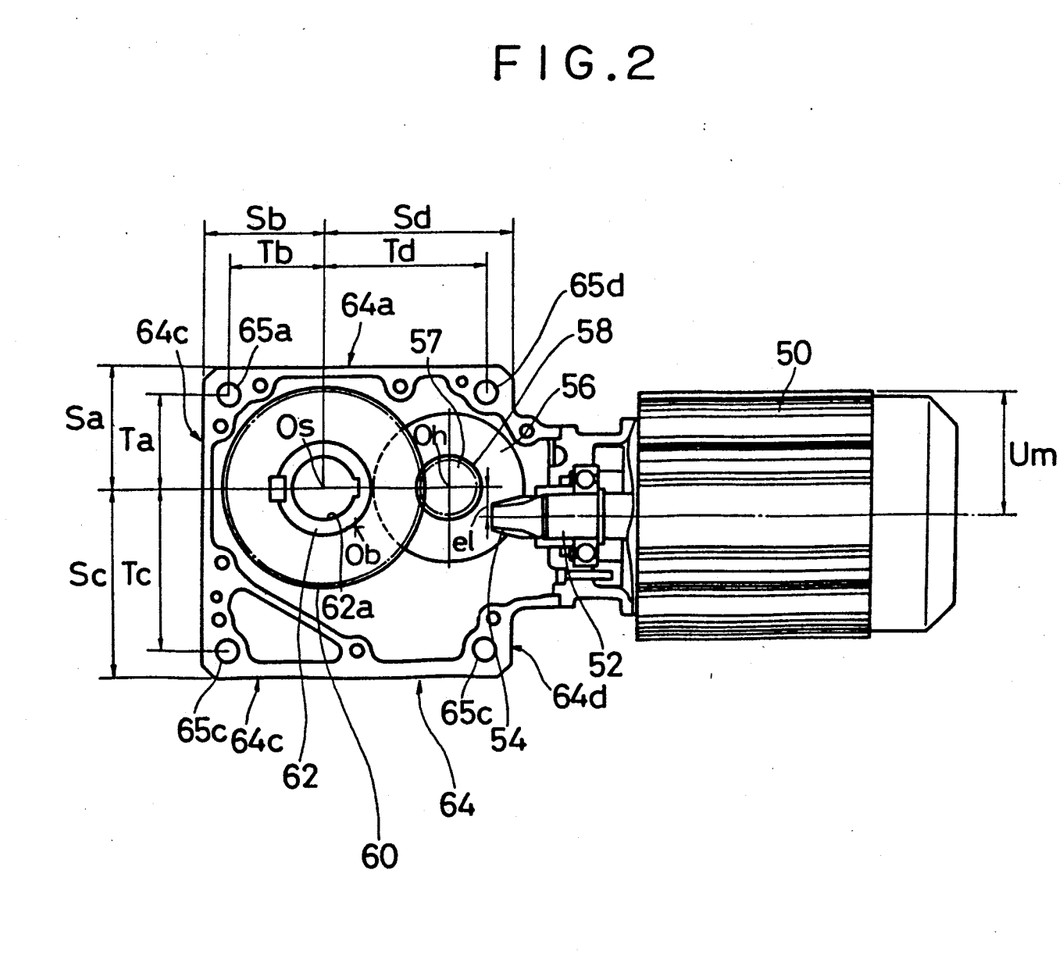
FIG. 2 is a cross sectional view showing the interior of the gearbox of the device of the above-mentioned embodiment.
Figure 3:
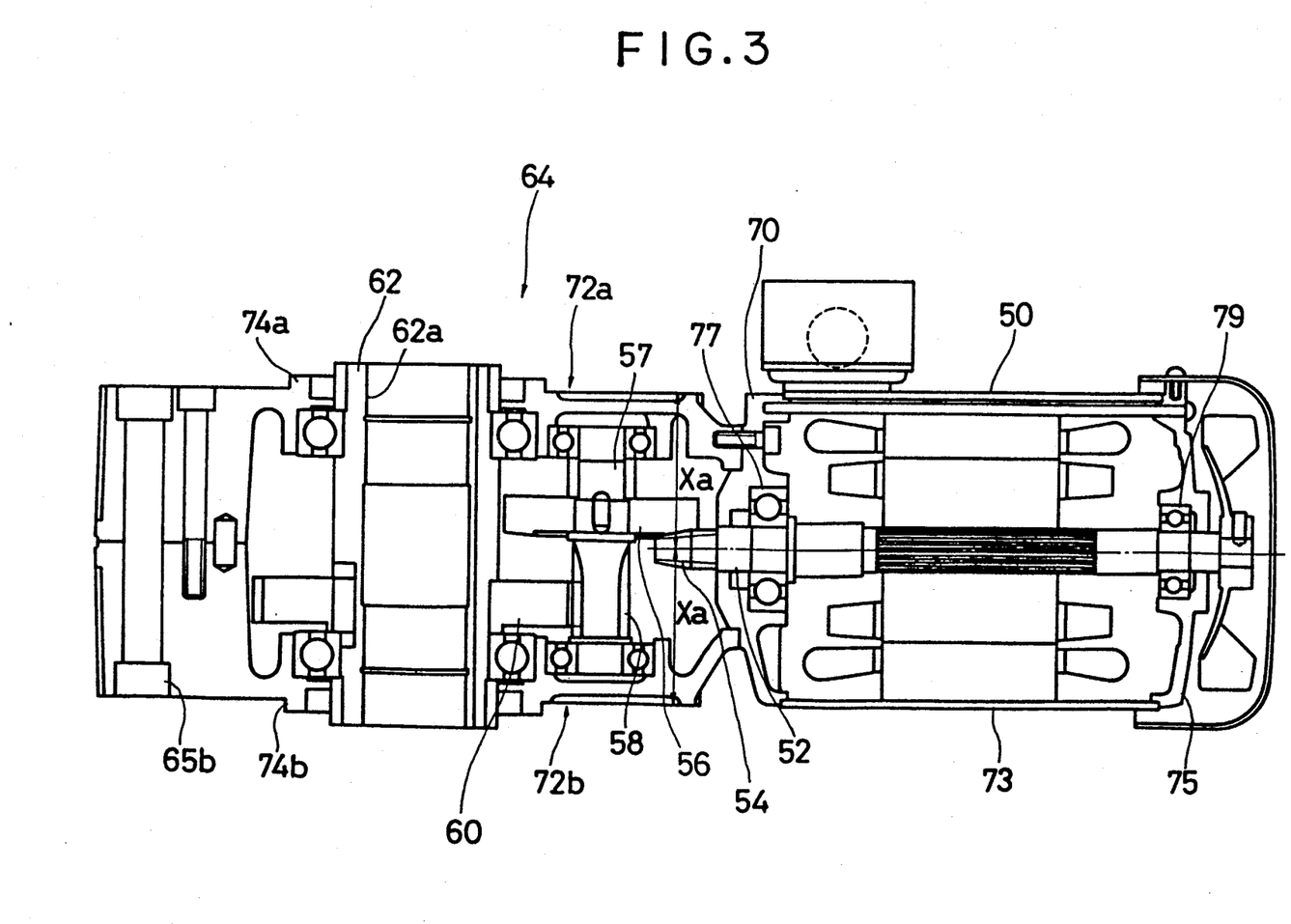
FIG. 3 is a cross sectional roll-out view showing the physical relationship of the gear train in the gearbox.

For reasons of convenience, FIG. 1 through FIG. 3 are used to describe the effects of the present invention.

In the present first invention, since the center Os of the output shaft 62 is displaced (offset) from the center Ob of the pitch of the holes for mounting 65a–65b, and, as regards two of the four outer surfaces of the gearbox 64, namely 64a, 64b, it is possible to make the amount of projection Sa, Sb from the center Os of the output shaft 62 small, which provides a highly space-efficient mounting when the device is mounted on the chain conveyor C or the like. In other words, if lengths of projections Sa, Sb the same as those of conventional arrangements is permissible, then a larger size motor or gearbox can be assembled accordingly.

Also, holes for mounting 65a–65d can be made with a large pitch at the outermost positions in the outer surfaces of the gearbox 64, which provides sufficient mounting strength, even if the torque in the gear device is large.

Also, since the output shaft 62 is a hollow shaft, the pitch of the holes for mounting 65a–65d is square, the holes for mounting 65a–65d pass through the gearbox, and since the output shaft 62 is displaced from the center of the square along one diagonal, it is possible to change mounting face from 72a to 72b (FIG. 3), which provides the possibility of changing the direction of the motor shaft 52 without any necessity of remodelling the mating machine nor the gear device itself.

In this case it is also always possible to make the side, whose amount of projection from the center Os of the output shaft is small, face to the identical position of the mating machine. Also, not only rotatable mounting at the same position, but also either side mounting to the mating machine is possible.

If shoulder flanges, the centers of which are identical with the center of the hollow output shaft, are formed in the mountable faces so that the shoulder flange bulge out from the mountable faces, the gear device of the present invention can be mounted not only by a so-called shaft-mounting but also by a flange-mounting utilizing the flange part as an indicator for mounting.

If the motor shaft is installed between the line joining the holes for mounting on the side farther away from the hollow output shaft of the gearbox, and the output hollow shaft, the motor can be coupled practically in the middle of the gearbox, even if the output shaft is displaced (offset) from the center of the gearbox, so that it is possible to install a motor almost the same size as the gearbox, while keeping the length from the hollow output shaft to a particular outer face small.

Because the side of face 64c which is farther away from the output shaft 62 generally has a large space, if the wall thickness of the face 64c is in part or in whole thick, then tapholes can be formed therein, which provides the possibility of "floor mounting".

In the following, the effects of the present second invention will be described.

In the case where the above-described first invention is realized, the output shaft must be a hollow shaft. Furthermore, it is necessary to adopt the gear structure that the direction of rotation of the motor shaft is changed to a right angle and the center of the output shaft is displaced (offset) from the motor shaft.

In the past, as orthogonal gear devices with a hollow output shaft, the devices using worm gears or bevel gears have been publicly known.

Figure 10:
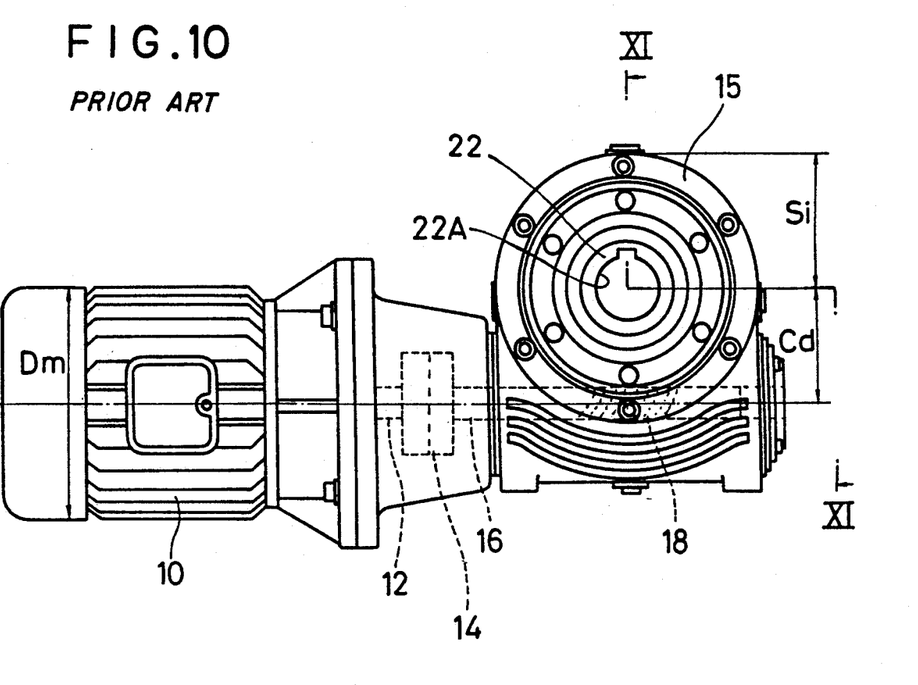
FIG. 10 is a front view of an example of a motor-equipped orthogonal gear device using a conventional worm gear.
Figure 11:
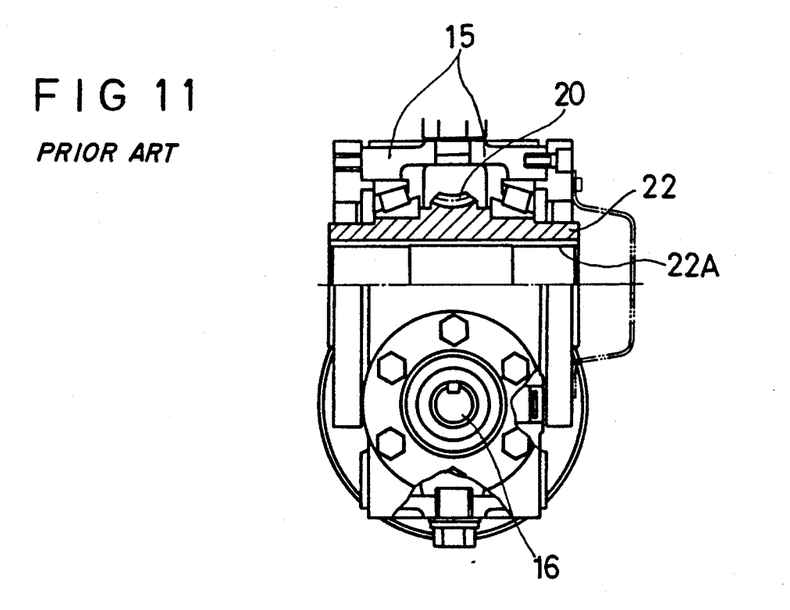
FIG. 11 is a view taken in the line XI—XI of FIG. 10.

FIG. 10 and FIG. 11 show an example of a hollow-shaft-type orthogonal gear device which uses a worm gear.

In both figures, if a motor shaft 12 is rotated by a motor 10, then the rotation of the motor shaft 12 is transmitted through the coupling 14 to the pinion shaft 16 in the gearbox 15, the direction of rotation is changed through worm pinion 18 and worm wheel 20 to the orthogonal direction and the rotation is transmitted to output shaft 22 which is united with the worm wheel 20. The shaft of the mating machine is inserted into the hollow bore 22A of the hollow output shaft 22 and the rotation of the hollow output shaft 22 is transmitted to the shaft of the mating machine. Incidentally, a member (not shown), which is called a torque arm, prevents the entire motor-equipped gear device from rotating.

Figure 12:
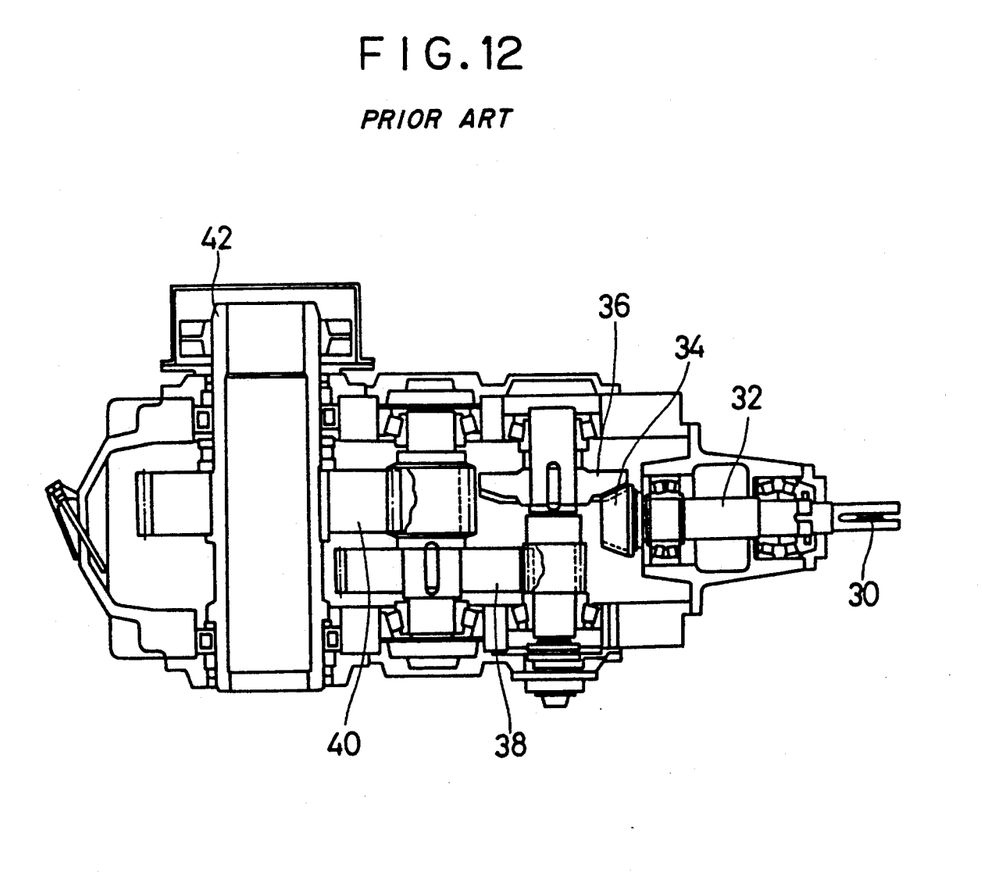
FIG. 12 is a cross sectional view of an example of an orthogonal gear device (a motor is omitted) using a conventional bevel gear.

FIG. 12 shows an example of a publicly known conventional hollow-shaft-type orthogonal gear device using a bevel gear.

The rotation of the motor shaft (not shown) is transmitted through key 30 to the bevel pinion shaft 32 and then it is further transmitted to bevel gears 34, 36. The bevel gears 34, 36 change the direction of rotation of the motor shaft to the orthogonal direction. Then the rotation is further transmitted through reduction gears 38, 40 to the hollow-shaft-type output shaft 42.

However, such conventional orthogonal gear devices with a hollow-shaft-type output shaft using a worm gear or a bevel gear as described above have the drawback that they can not sufficiently meet the size limitations and the performance required in modern industries.

That is, in modern industries the following requirements should be met:

(1) short overall length and light weight, (2) high start-up efficiency; because chain conveyors are not operated all the time, but operate only when operation is required.

(3) high efficiency during operation in order to lower operation costs by reducing power consumption.

(4) low noise in order to keep the working environment around chain conveyors well, (5) easy creation of speed reduction ratios ranging from approximately 1/5 to 1/120 using one type of gearbox in order to adapt to various chain conveyor speeds.

However, in the past, no orthogonal gear device having a hollow-type output shaft and satisfying these conditions (1)–(5) has existed.

That is, a gear device as shown in FIG. 10 and FIG. 11 using a worm gear certainly offers the advantage that a speed reduction ratio of up to 1/80 can be produced with a single gear and that it is basically easy to achieve low noise due to sliding contact. However, the large sliding results in poor efficiency in the region of high speed reduction ratios, and moreover, since the start-up efficiency further decreases, a more powerful (big) motor is required accordingly. This is disadvantageous in that it leads to increased power consumption and thus to increased operation cost.

Also, since it is generally not possible to directly cut a worm gear into the motor shaft, the worm pinion shaft and the motor shaft must be coupled using a coupling 14. Accordingly, with regard to the size there is the disadvantage that, (beside a big motor itself due to poor efficiency) the length in the axial direction tends to become large.

In addition, the radius Si of the gearbox 15, which is determined by the diameter of the worm wheel, the center distance Cd between the worm pinion shaft 16 and the worm wheel 20, and the diameter Dm of the motor 10 also cause the length to tend to become large in height direction.

Thus, with regard to the size, the weight, and the power consumption, a motor-equipped orthogonal gear device using a worm gear does not meet the performance required in the chain conveyor field.

On the other hand, while the orthogonal gear devices using a bevel gear as shown in FIG. 12 have good efficiency due to the rolling contact, the transmission capability is small because of the small meshing ratio, and it is difficult to realize low noise operating.

Also, since bevel gears can not provide speed reduction ratios greater than about ¼, it is necessary to provide gears 38 or 40 used for getting high speed reduction in a subsequent stage of the bevel gear, which results in the problem of an increased size and weight accordingly.

The present second invention was carried out in view of these problems and provides a lightweight, compact, low-noise and highly efficient motor-equipped orthogonal gear device which is ideal for driving physical distribution equipment, in particular chain conveyors and which allows the present first invention to be more effectively embodied.

That is, in the present second invention (to give an explanation FIG. 2 is referred to for reasons of convenience) the hypoid pinion 54 is directly formed on the motor shaft 52 of the motor 50 and the hypoid pinion 54 meshes with the hypoid gear 56. The hypoid gear 56 is mounted on the shaft 57, the center of which is displaced (offset) from the center of the motor shaft 52 by an amount el and which makes a right angle with the motor shaft 52.

The rotation of the motor 50 is transmitted through the motor shaft 52, the hypoid pinion 54, and the hypoid gear 56 (in the illustrated example, additionally through the second stage pinion 58 and the output shaft gear 60) to the output shaft 62. The mesh of the hypoid pinion 54 and the hypoid gear 56 causes a change of 90° in the direction of rotation of the motor shaft 52 as well as a displacement (offset) of the shaft center of the motor shaft 52 by an amount el.

Taking advantage of this displacement of the motor shaft 52 from the center of the output shaft 62 by the amount el facilitates the embodiment of the first invention. That is, while keeping the distance Sa from the center Os of the output shaft 62 to a particular face 64a of the gearbox 64 small, it is easy to assemble a motor 50 whose radius is Um, with Um being larger than Sa. And the motor 50 does not project from the particular face 64a.

In addition, the use of a hypoid gear provides greater speed reduction ratios as compared to conventional arrangements using bevel gears. Thus, the same speed reduction ratios can be realized with less gear stages so that light weight, compactness, low cost, and low noise are possible.

Also, as compared to conventional arrangements using worm gears, it is possible to improve both the dynamic and static efficiency while the advantageous feature of low noise is still maintained. Namely, a small motor suffices to obtain the same required torque. Conversely, a greater output torque can be obtained using a same size motor. As a result, light weight, compactness, and reduced power consumption become possible. Also, since all gears may be chosen to be high-hardness gears, the size of the gears may be made smaller than that of worm gears to obtain the same transmission torque.

If, in addition to the above-described effects, the center Os of the output shaft is displaced (offset) from the center Ob of the holes for mounting 65a–65b, as regards two of the four outer faces 64a–64d of the gearbox 64, namely 64a, 64b, it is possible to make the amount of projection from the center Os of the output shaft 62 small, which allows a highly space-efficient mounting when the device is mounted on the chain conveyor or the like.

In other words, combined with the effects of the second invention, it is possible to assemble a large-size motor 50 or gearbox 64 without any interference, while the length from the center Os to the faces 64a or 64b is to be small.

As explained above, the present invention provides the outstanding effect that it can obtain a motor-equipped orthogonal gear device which has a large output and high efficiency, the effect being achieved by a more lightweight and more compact design as compared to the prior art.

Also, using a motor-equipped gear device of the same scale provides the possibility of keeping the amount of projection of the face, which should not project from the output axis, as small as possible and of securing a variety of assembling possibilities so that it is possible to obtain the outstanding effect of an improved space-efficient assembly.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts and wherein.

DESCRIPTION OF THE PREFERRED EMBODIMENTS

The preferred embodiments of the present invention will be described in detail hereinunder with reference to the drawings.

FIG. 1 is a front view of an example of an embodiment. The present invention is applied to drive a chain conveyor C. FIG. 2 is a cross sectional view showing the gear device of the above-mentioned embodiment. FIG. 3 is a cross sectional roll-out view showing the physical relationship of a gear train.

In FIGS. 1 to 3, the numerals 50, 64 and 62 designate a motor, a gearbox and an output shaft, respectively.

A hypoid pinion 54 is integrated (directly formed) in a motor shaft 52 of the motor 50. The hypoid pinion 54 meshes with a hypoid gear 56.

The center of the shaft 57 of the hypoid gear 56 is displaced (offset) from the center of the motor shaft 52 by an amount el, and the shaft 57 of the hypoid gear 56 and the motor shaft 52 are orthogonal. A second stage pinion 58 is cut into the shaft 57, and the second stage pinion 58 meshes with an output shaft gear 60 which is an integral part of the output shaft 62.

The output shaft 62 is provided with a hollow bore 62a which passes through the gearbox 64, namely, the output shaft 62 is a so-called hollow shaft.

The holes for mounting 65a–65d in the gearbox 64 also pass through the gearbox 64.

In this embodiment, the physical relationship between outer faces 64a–64d of the gearbox 64, the output shaft 62 and holes 65a–65d is as follows:

$$Sa = Sb, Sc = Sd, Sa + Sc = Sb + Sb,$$
$$Ta = Tb, Tc = Td, Ta + Tc = Tb + Td,$$
$$Sa < Sc, Sb < Sd, \text{ and } Ta < Tc, Tb < Td.$$

That is, the holes 65a–65d are located at the vertexes of a square and the output shaft 62 is offset from the square's center, and located on one diagonal of the square.

The outer faces, through which the output shaft 62 and the holes 65a–65d pass, are made to be mountable faces 72a, 72b. The mountable faces 72a, 72b have formed therin shoulder flange 74a, 74b, the centers of which are identical with the center of the output shaft 62 and which bulge out from the mountable faces 72a, 72b.

The motor shaft 52 is supported by bearings 77, 79 within a joint cover 70, a motor frame 73 and a cover 75.

Furthermore, the motor shaft 52 is assembled so that it is parallel to the line joining the center Os of the output shaft 62 and the center Oh of the hypoid gear 56, and so that the offset amount el occurs, on the side of the outer face 64c. Also, the motor shaft 52 is assembled at an equal distance Xa from the two mountable faces 72a, 72b (FIG. 3).

Figure 4:
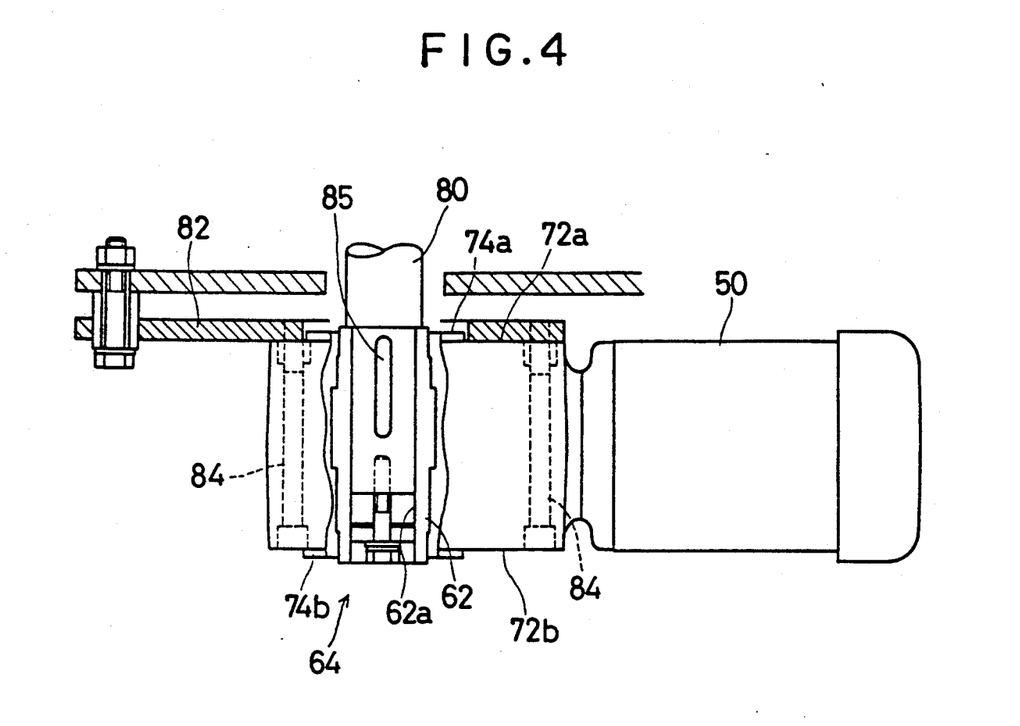
FIG. 4 is a top view of an example of the device of the above-mentioned embodiment being assembled onto the shaft of the mating machine.
Figure 5:
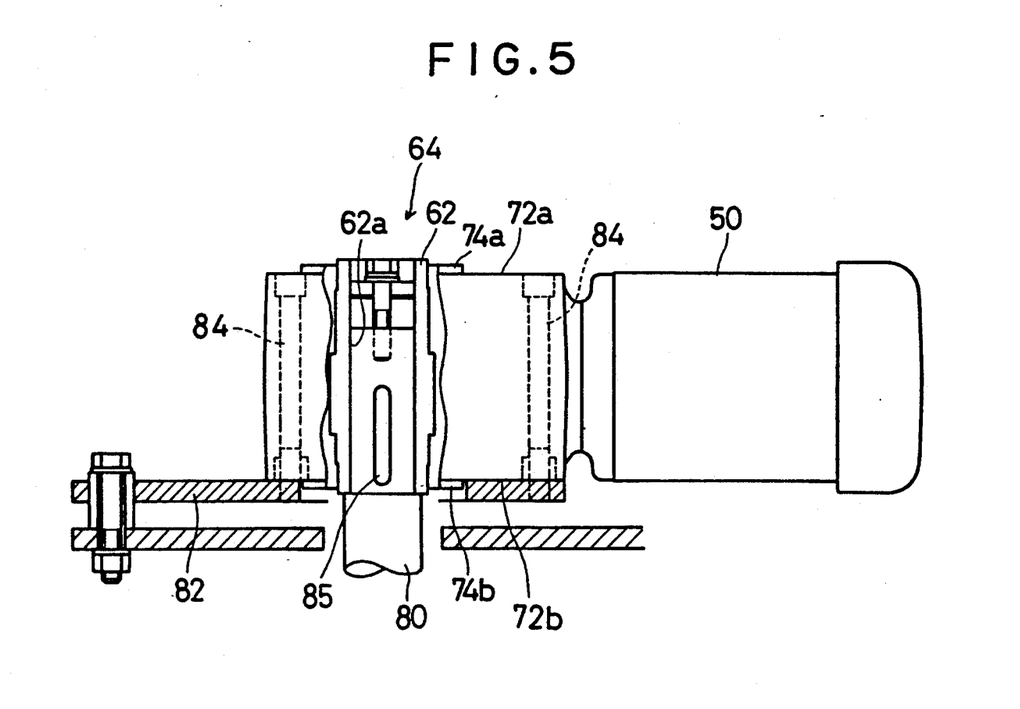
FIG. 5 is a top view of another example of a mounting to the mating machine.

As shown in FIG. 4 and FIG. 5, the hollow-shaft orthogonal gear device is mounted on the chain conveyor C by inserting the shaft 80 of the chain conveyor C into the hollow bore 62a of the output shaft 62 using a key 85 as whirl-stopper and by fixing it to the chain conveyor C with a torque arm 82 (so called shaft mounting).

From the two drawings it is obvious that the hollow-shaft orthogonal gear device can be mounted from either direction. Securing the gear device to torque arm 82 by means of a bolt 84 is necessary. If the entire gear device is not fixed (whirl-stop) to the chain conveyor C by some means, then the relation of the load strength prevents the shaft 80 of the chain conveyor c from rotating and causes the entire gear device itself to rotate around the shaft 82 of the chain conveyor c.

Figure 6:
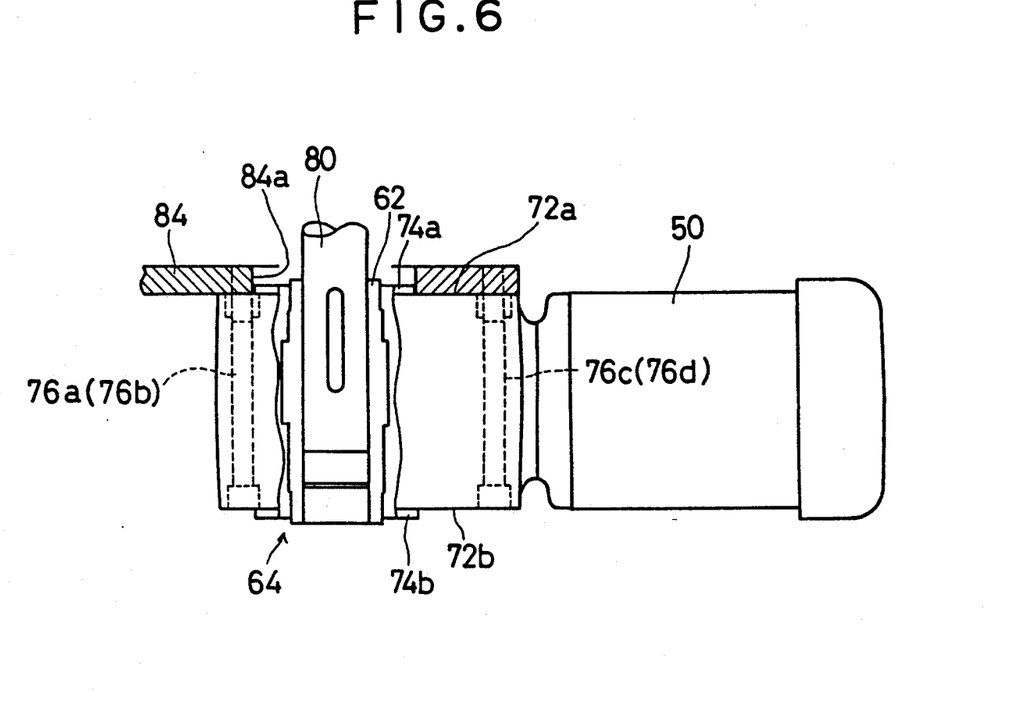
FIG. 6 is a top view of another example of a mounting to the mating machine.
Figure 7:
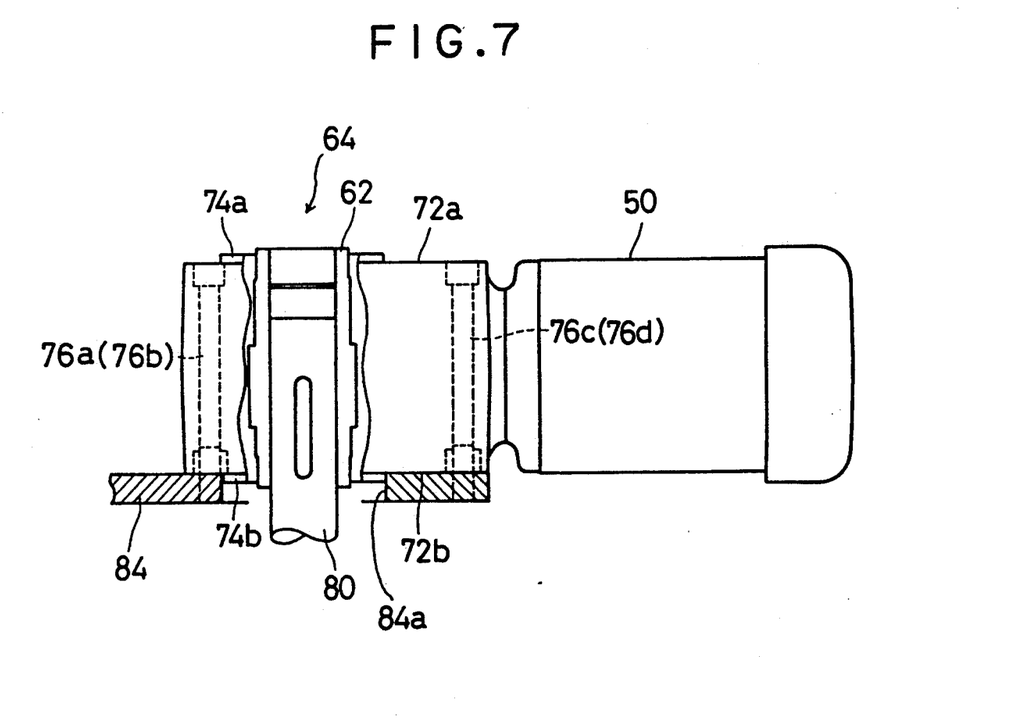
FIG. 7 is a top view of another example of a mounting to the mating machine.

As shown in FIG. 6 and FIG. 7, the gear device need not be shaft-mounted but may also be directly secured to the mounting face 84 of the chain conveyor c by means of the shoulder flange 74a, 74b and mounting bolts 74a-76d (so-called flange mounting).

If the gear device is mounted by this method of mounting, then a centering of the shaft 80 of the chain conveyor C and the output shaft 62 is necessary. However, as the shoulder flange 74a, 74b are formed so that their centers are identical with the center of the output shaft 62 and that they bulge out from the mountable faces 72a, 72b, fitting the shoulder flange 74a, 74b into the opening 84a of the mounting face 84 of the chain conveyor c allows an exact centering.

Figure 8:
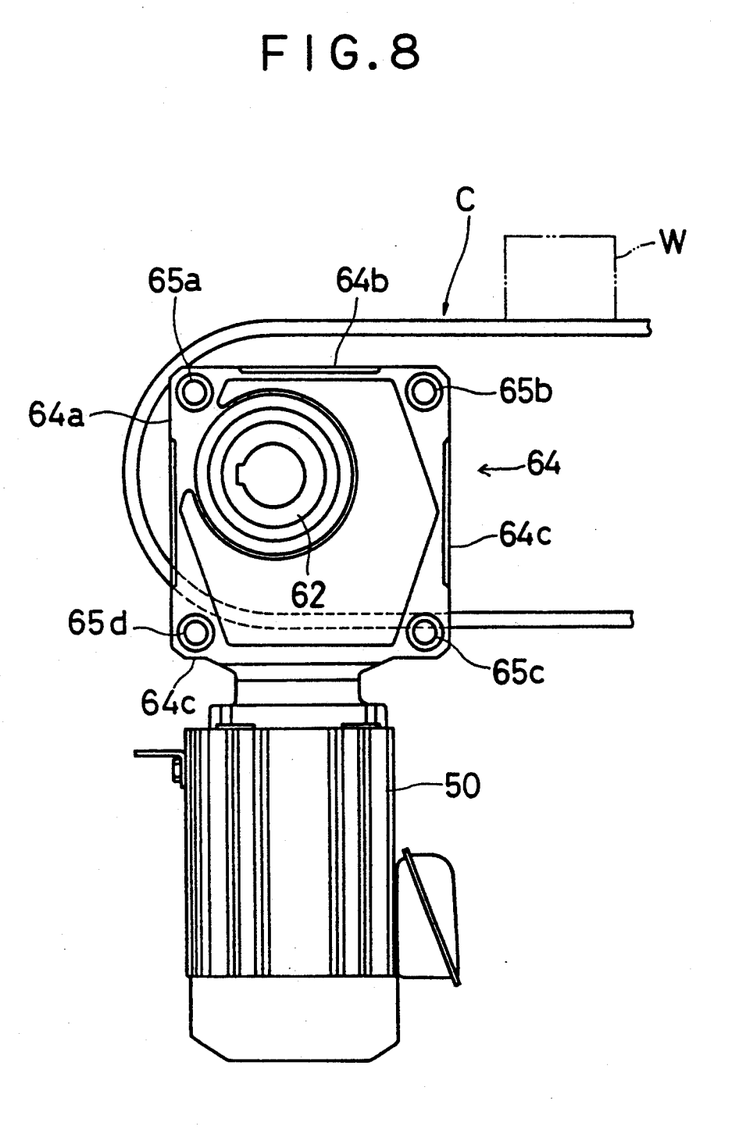
FIG. 8 is a top view of another example of a mounting to the mating machine.

Also, as shown in FIG. 8, the gear device may be installed in a 90° rotated manner (for both the shaft mounting and the flange mounting). In this case, depending upon the selection of the mountable faces 72a, 72b, it is always possible to make the outer faces 64a, 64b, which are close to the output shaft 62, face the conveying face and the return face of the chain conveyor c.

Figure 9:
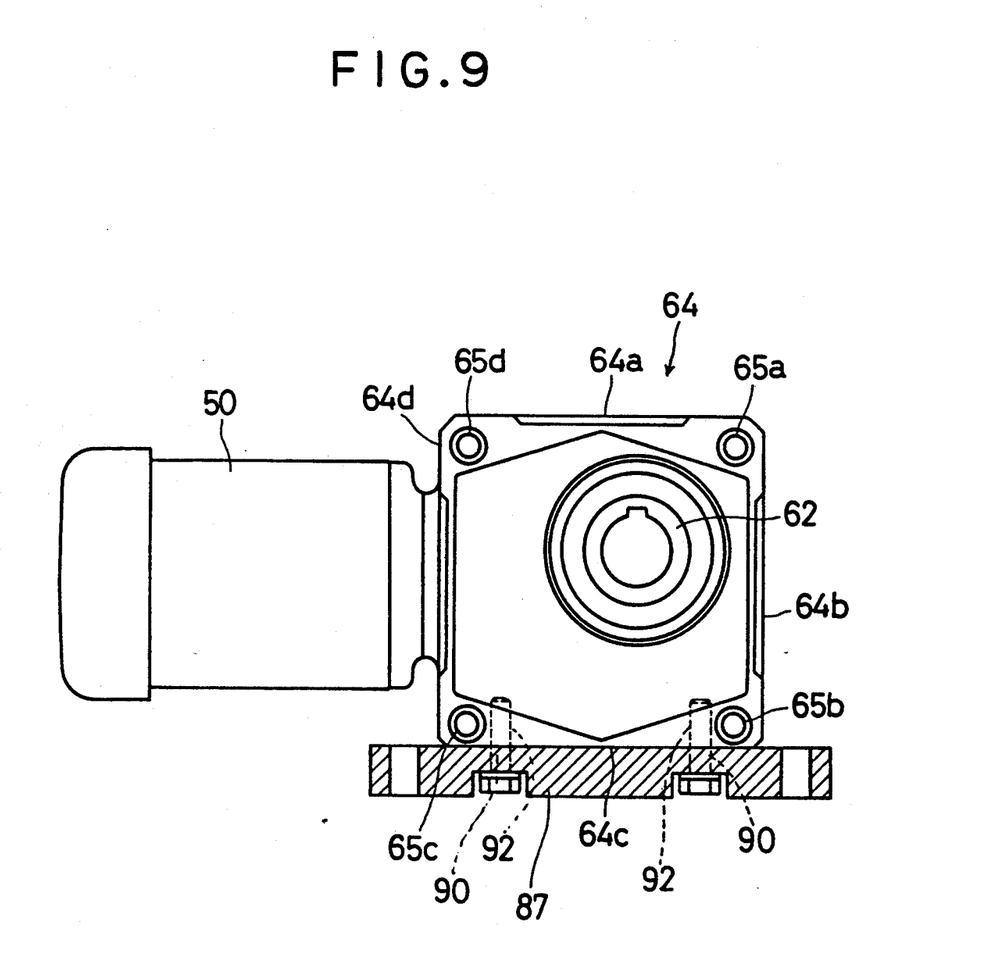
FIG. 9 is a front view of an example of a mounting to the floor.

Also, as shown in FIG. 9, tapholes 92 are formed in the outer face 64c so that the gear device can also be secured to a floor using bolts 90. Since the face 64c, which is located farther away from the output shaft 62, generally has large space around itself, it is possible to increase the wall thickness of the gearbox 64 and form such tapholes 92. In this case too, a mounting of two directions against the motor 50 is possible.

In this embodiment, the rotation of the motor shaft 52 is transmitted through the hypoid pinion 54 to the hypoid gear 56, and then the rotation axis is changed by 90°, the center of the axis of the rotation is offset by an amount el, and deceleration of a relatively large speed reduction ratio is performed. The rotation of the hypoid gear 56 is further decelerated by the second stage pinions 58 and the output shaft gear 60, and as a result, the output shaft 62 is rotated.

Since the shaft 80 of the chain conveyor C is fitted into the output shaft 62 and gear device itself is supported by the torque arm 82 to prevent the gear device from rotating (the cases of FIG. 4, FIG. 5), the rotation of the output shaft 62 causes the shaft 80 of the chain conveyor c to rotate.

In this case, since the motor shaft 52 is assembled so that it is displaced (offset) by an amount el toward the face 64c, and since the face 64c is largely projected from the center Os of the output shaft 62, it is possible to assemble a motor of radius Um larger than Sa (that is a motor with a larger output as compared to a motor of radius Sa accordingly) so that the motor does not project from the outer face 64a. Furthermore, the amount of projection Sa of the gearbox 64 from the center of the output shaft 62 is kept small.

Also, since this gear device provides the possibility of forming the holes for mounting 65a-65d with a large pitch near the outer faces 64a-64d of the gearbox 64, it is possible to maintain a large mounting strength when it is compared to Japanese Laid-Open Utility Model Application2-22450. Forming of the holes for mounting (pass-through holes) 65a-65d near the outer faces 64a-64d also offers the advantage of an easy forming of pass-through openings therein when it is compared with the forming of pass-through openings in the center section of the gearbox 64.

In addition, the above-described embodiment provides a compact shaft structure. Namely, since the hypoid pinion 54 differs from a bevel gear it can be directly cut into the motor shaft 52, it is possible to eliminate a coupling for the linkage of the motor shaft 52 and the input shaft of the gearbox 64.

Also, as compared with gear devices using worm gears, the use of a hypoid gear set contributes to improved both dynamic and static efficiency so that a small motor is sufficient to obtain the same required torque, and conversely, using a motor with the same scale as used for a worm gear provides a large output torque.

Also, as compared with gear devices using worm gears, since all gears may be chosen to be high-hardness gears, the size of the gear may be kept small to obtain the same transmission torque.

On the other hand, as compared with gear devices using bevel gears, while efficiency is slightly less, it is possible to achieve low noise. Also, since an extremely large speed reduction ratio can be chosen, the number of stages of the gear can be reduced to obtain the same speed reduction ratio, which allows the realization of a lightweight and compact structure.

What is claimed is:

1. A motor-equipped orthogonal gear device provided with a motor and a gearbox, said motor having a motor shaft, said gearbox being mounted to a mating machine, comprising, a hollow output shaft of said gearbox which passes through said gearbox, said hollow output shaft being arranged so that it is orthogonal to said motor shaft, holes for mounting which are arranged in four vertex positions of a square, said square being such that a position of said hollow output shaft is on a diagonal of said square and said position is, at the same time, displaced from a center of said square, and said holes for mounting also pass through said gearbox, and two mountable faces through which said output shaft and said holes for mounting pass, said gearbox being mounted to said mating machine through one of the mountable faces.

2. The motor-equipped orthogonal gear device according to claim 1, wherein
   shoulder flanges, the centers of which are identical with the center of said hollow output shaft, are formed in said two mountable faces so that the shoulder flanges bulge out from said mountable faces respectively.

3. The motor-equipped orthogonal gear device according to claim 1, wherein
   said motor shaft is installed between the line which joins said holes for mounting on a side farther away from said hollow output shaft, and said hollow output shaft of the gearbox.

4. The motor-equipped orthogonal gear device according to claim 2, wherein
   said motor shaft is installed between the line which joins said holes for mounting on a side farther away from said hollow output shaft, and said hollow output shaft of the gearbox.

5. The motor-equipped orthogonal gear device according to claim 1, wherein
part of at least one gearbox face that is, as a result of said displacement, farther away from the hollow output shaft, is thickened and tapholes are formed in the thickened portion in order to make said gearbox face another mountable face.

6. The motor-equipped orthogonal gear device according to claim 2, wherein
part of at least one gearbox face that is, as a result of said displacement, farther away from the hollow output shaft, is thickened and tapholes are formed in the thickened portion in order to make said gearbox face another mountable face.

7. The motor-equipped to orthogonal gear device according to claim 3, wherein
part of at least one gearbox face that is, as a result of said displacement, farther away from the hollow output shaft, is thickened and tapholes are formed in the thickened portion in order to make said gearbox face another mountable face.

8. The motor-equipped to orthogonal gear device according to claim 4, wherein
part of at least one gearbox face that is, as a result of said displacement, farther away from the hollow output shaft, is thickened and tapholes are formed in the thickened portion in order to make said gearbox face another mountable face.

9. A motor-equipped orthogonal gear device provided with a motor and a gearbox, said motor having a motor shaft, said gearbox being mounted to a mating machine, comprising,
a hollow output shaft of said gearbox, said hollow output shaft being arranged so that it is orthogonal to said motor shaft,
a hypoid pinion which is directly formed on the motor shaft,
a shaft, a center of which is displaced from the center of said motor shaft, and which is orthogonal to the motor shaft, and
a hypoid gear which is mounted on said shaft and is meshed with said hypoid pinion.

10. The motor-equipped orthogonal gear device according to claim 9, wherein
holes for mounting are provided in said gearbox, said holes for mounting being vertex positions of a square or a rectangle,
said hollow output shaft of said gearbox is displaced from the center of said square or said rectangle, and
said motor shaft is installed between the line which joins said holes for mounting on a side that is, as a result of said displacement, farther away from the hollow output shaft, and said hollow output shaft of the gearbox.

* * * * *